United States Patent
Gaffiero et al.

(10) Patent No.: US 7,473,077 B2
(45) Date of Patent: Jan. 6, 2009

(54) SYSTEM FOR MONITORING DAMAGE TO A ROTOR BLADE OF A ROTARY-WING AIRCRAFT

(75) Inventors: Jacques Gaffiero, Paris (FR); Jean-Patrick Boderlique, Le Plessis Belleville (FR); Claude Laloi, Presles (FR)

(73) Assignee: Eurocopter, Marignane (FR)

( * ) Notice: Subject to any disclaimer, the term of this patent is extended or adjusted under 35 U.S.C. 154(b) by 471 days.

(21) Appl. No.: 11/272,778

(22) Filed: Nov. 15, 2005

(65) Prior Publication Data

US 2006/0239818 A1  Oct. 26, 2006

(30) Foreign Application Priority Data

Nov. 23, 2004 (FR) .................. 04 12406

(51) Int. Cl.
*B64C 27/473* (2006.01)
*G01N 27/02* (2006.01)

(52) U.S. Cl. ........................... 416/61; 416/230
(58) Field of Classification Search .......... 415/13, 415/14, 118; 416/31, 61, 229 R, 230; 73/799, 73/802
See application file for complete search history.

(56) References Cited

U.S. PATENT DOCUMENTS

| | | | |
|---|---|---|---|
| 3,596,269 A | 7/1971 | Laska | |
| 3,744,300 A | 7/1973 | Fleury | |
| 3,910,105 A * | 10/1975 | Hoffstedt | ........... 73/800 |
| 4,106,332 A | 8/1978 | McKeown | |
| 4,524,620 A | 6/1985 | Wright et al. | |
| 5,015,842 A * | 5/1991 | Fradenburgh et al. | .. 250/227.15 |
| 5,227,731 A | 7/1993 | Prabhakaran et al. | |
| 5,379,644 A | 1/1995 | Yanagida et al. | |
| 5,454,693 A | 10/1995 | Aubry et al. | |
| 5,462,408 A | 10/1995 | Coffy | |
| 5,952,836 A | 9/1999 | Haake | |
| 7,106,215 B2 * | 9/2006 | Marishak, Jr. | ........... 340/945 |

FOREIGN PATENT DOCUMENTS

| | | |
|---|---|---|
| EP | 0 414 924 | 3/1991 |
| FR | 2 119 182 | 12/1970 |
| FR | 2 699 498 | 6/1994 |
| FR | 2 699 499 | 6/1994 |
| FR | 2 740 379 | 4/1997 |

* cited by examiner

*Primary Examiner*—Edward Look
*Assistant Examiner*—Nathaniel Wiehe
(74) *Attorney, Agent, or Firm*—Young & Thompson

(57) ABSTRACT

A rotary-wing aircraft rotor blade (23) includes (semi)conductive loops (10) extending along axes (19A to 19C, 19W to 19Z) that are oblique relative to the longitudinal axis (26) of the blade. Impedance changes in the loops are sensed that indicate a location of damage to the blade.

13 Claims, 3 Drawing Sheets

SYSTEM FOR MONITORING DAMAGE TO A ROTOR BLADE OF A ROTARY-WING AIRCRAFT

BACKGROUND OF THE INVENTION

The present invention relates to a system for monitoring damage to a rotor blade of a rotary-wing aircraft, to an aircraft rotor blade and to an aircraft fitted with such a system.

The technical field of the invention is that of manufacturing rotary-wing aircraft.

Various devices for monitoring damage to a blade of a rotor for providing a helicopter with lift and forward drive have been proposed.

Patents FR 2 119 182 and U.S. Pat. No. 3,744,300 describe a device for measuring damage due to fatigue in a helicopter blade, the device including a sensor comprising strain gauges connected in a Wheatstone bridge configuration.

U.S. Pat. No. 4,106,332 describes a device for detecting an interruption in a conductive loop applied to the surface of a helicopter rotor blade; the device includes a bistable serving, in flight, to record a state corresponding to detecting a fault that led to the conductive loop being interrupted; when the aircraft is on the ground, a unit can be connected to the blade in order to read the state of the bistable in order to test the blade while it is at rest.

A drawback with such systems is that they do not make it possible to determine the location and the extent of the fault affecting the blade.

U.S. Pat. No. 3,596,269 describes a system for detecting and monitoring structural faults in the skin of an airplane. That system comprises a group of thin elongate electrical conductors constituted by two metal sheets interconnected by a resistor; the conductors are connected in parallel and they are placed between two insulating sheets; the assembly is stuck to different points on the skin of an airplane. A switch enables an operator manually to select a group for measuring its resistance by means of an ohmmeter; a visual or audible alarm is provided.

A drawback with such systems is that they are adapted poorly or not at all to monitoring the defects that might appear on the surface or inside a blade made of composite material.

U.S. Pat. No. 4,524,620 describes apparatus for acoustically monitoring the noise emitted by a composite helicopter blade; the blade is fitted with one or more acoustic transducers and the signals therefrom are multiplexed where necessary, and then filtered and forwarded to a computer or to a recorder; a filter serves to detect and eliminate "normal" noise so as to pass only "critical" noise representative of excessive stresses in the blade and structural damage caused to the blade; the occurrence and the intensity of such critical noise are accumulated in the recorder or the computer in order to constitute a history of critical noise from a given blade.

Such a device is complex; furthermore locating a defect in the blade requires triangulation calculations to be performed, in deferred time, and on the ground, using an auxiliary computer.

SUMMARY OF THE INVENTION

An object of the invention is to propose a rotary wing blade of composite material that is fitted with a simple and high-performance system for monitoring damage to the structure of the blade.

An object of the invention is to propose a system for acting while a rotary-wing aircraft is flying to monitor the appearance and the behavior in real time of damage to one or more blades of the wing, which system is improved and/or remedies the shortcomings and drawbacks of known systems, at least in part.

An object of the invention is also to propose a rotary-wing aircraft including such a monitoring system.

In a first aspect of the invention, there is provided a rotor blade for a rotary-wing aircraft, the blade presenting a longitudinal axis and including (semi)conductive loops extending along axes or directions that are oblique relative to the longitudinal axis.

In a preferred embodiment of the invention, a blade is provided for a main or auxiliary rotor of a rotary-wing aircraft, the blade comprising a root, a leading edge, a trailing edge, at least one spar, and a skin covering the spar(s); the blade includes a plurality of conductive or semiconductive loops extending under the skin and disposed obliquely or transversely relative to the longitudinal axis of the blade; the blade further includes a loop selector, and a member for measuring the resistance (or the impedance) of a loop, which selector and member are integrated in the root of the blade, and a plurality of electrical connections connecting the selector to each of the loops, respectively; this enables data or impedance measurements concerning each of the loops to be transmitted to a computer on board the aircraft while using only two conductors, or where appropriate, via a single-channel wireless link.

In another preferred embodiment of the invention, there are provided: a blade for an aircraft rotary wing, the blade including a plurality of loops each presenting an impedance; an impedance-measuring device designed and arranged to measure the impedance of a loop, and delivering a loop-impedance measurement signal; a scanner and connector device designed and arranged to connect each of the loops in the plurality of loops in succession to the impedance-measuring device, by scanning the loops of the plurality of loops regularly and in a determined order; an analog-to-digital converter designed and arranged to transform each measurement of the impedance-measuring device into digital impedance data; and transmission means designed and arranged to transmit the impedance data to an on-board computer.

In another aspect of the invention, there is a provided a blade for a main or auxiliary rotor of a rotary-wing aircraft, in particular a helicopter, the blade presenting a composite structure including fibers, in particular glass or carbon fibers, that are embedded in a thermoplastic or thermosetting matrix; the blade including a plurality of substantially conductive loops (possibly including semiconductor elements, where appropriate) each presenting an impedance; the loops extending parallel to some of the fibers so that the mechanical performance of the blade fitted with the loops is substantially identical to that of the same blade not having any loops, whereby inserting the loops in the structure of the blade does not significantly degrade or modify the mechanical and aerodynamic characteristics of the blade, and whereby manufacture of the blade is also facilitated.

In other preferred embodiments of the invention:

the blade includes, on its pressure side and/or its suction side, a first group of substantially conducive loops extending in a first direction parallel to first fibers and/or to a first sheet of fibers of the structure of the composite blade; the blade further includes a second group of substantially conductive loops extending in a second direction parallel to second fibers and/or to a second sheet of fibers of the structure of the composite blade, the second direction being different from the first direction;

the blade includes a first array of first loops that are mutually parallel and disposed in a first layer, and a second array of second loops that are mutually parallel and that cross the first array;

the blade includes a layer of electrically insulating material separating two crossed and superposed arrays or layers of conductive loops;

each loop includes a plurality of bridges or conductive or semiconductive elements interconnecting the two strands of the loop (and/or connected in parallel);

each of these bridges or elements presents an impedance (in particular a resistance) that is substantially identical, e.g. close to a few hundreds or thousands of ohms;

each loop includes at least three bridges or (semi)conductive elements regularly spaced apart from one another along the axis of the loop;

the blade includes several tens or hundreds of bridges or (semi)conductive elements, and where appropriate several tens or hundreds of loops including such bridges or (semi)conductive elements;

the number of loops depends on the spacing or "pitch" between loops, and determines the size of damage that can be measured; this pitch may vary over the blade depending on the degree of vulnerability of the zone being monitored;

said first and second directions along which the series of loops extend are inclined relative to the longitudinal axis of the blade and relative to a transverse axis of the blade (orthogonal to the longitudinal axis), e.g. being inclined relative to these axes by an angle close to 45° (to within plus or minus 10°);

said first direction is substantially perpendicular to said second direction;

said loops are connected to the scanner or selector device by respective pairs of metal wires (or strips);

said bridges or (semi)conductive elements are surface-mounted components (SMCs);

the loops, the loop selector(s), the impedance-measuring device(s), and where appropriate the analog-to-digital converter(s) integrated in the blade are powered electrically by a supply of electrical energy integrated in the blade (an optionally-rechargeable battery), and/or by a circuit for supplying power for de-icing the blade;

the signals or data relating to the impedances of the loops are transmitted to an on-board calculator via a slip-ring assembly connecting a rotor bearing to the rotor hub, and/or via wireless transmission, e.g. radio transmission;

the conductive elements connecting the loops to the loop selector are grouped together in a bundle or cord extending close to the leading edge of the blade, the loops extending from said bundle or cord towards the trailing edge of the blade.

In particular, the cord is preferably located inside or in the immediate proximity of the spar of the blade. This disposition enables the cord to be protected by the spar which remains the last portion of the blade to be damaged after an impact.

By using an oblique configuration for disposing the loops that can be monitored for variations in impedance as a result of damage to a portion of the blade, it is possible to implement a system for monitoring the state of the blade in flight that is simple, compact, and of high performance.

In particular when the blade incorporates two crossed arrays of parallel loops, each loop including a plurality of same-impedance bridges, it is much easier to locate and evaluate damage that has caused electrical continuity to be broken in one or more loops.

BRIEF DESCRIPTION OF THE DRAWINGS

Other characteristics and advantages of the invention appear from the following description which refers to the accompanying drawings which show preferred and non-limiting embodiments of the invention.

DESCRIPTION OF THE PREFERRED EMBODIMENTS

Figure 1:
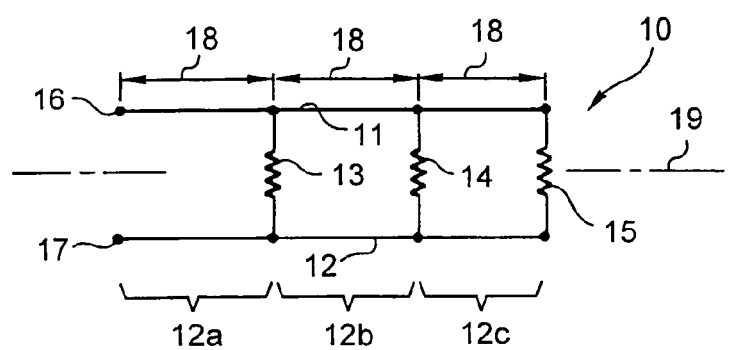
FIG. 1 is an electrical circuit diagram of a loop having three bridges in a system of the invention.

With reference to FIG. 1 in particular, the loop 10 comprises two parallel conductor strands 11 and 12 that are interconnected by three identical resistors 13, 14, and 15.

When the resistance of the three resistive bridges 13, 14, 15 is identical and much greater than the resistance of the strands 11 and 12, then the impedance of the loop 10 as "seen" from its poles 16 and 17 is equal to one-third of the resistance of each of the bridges, assuming there has been no damage; when damage to the blade causes at least one of the strands 11, 12 to be broken in an end zone such as the zone 12c at the end of the strand 12 (and of the loop 10), then the resistance of the loop becomes equal to half the resistance of each of the bridges; when damage to the blade breaks at least one of the strands 11, 12 in a middle zone such as the middle zone 12b of the strand 12 (and the loop 10), then the resistance of the loop becomes equal to the resistance of each of the bridges; and when damage to the blade breaks at least one of the strands 11, 12 in a head zone such as the zone 12a at the head of the strand 12 (and of the loop 10), then the resistance of the loop becomes substantially infinite, since the loop is then open-circuit.

When the bridges 13 to 15 are regularly distributed along the longitudinal axis 19 of the loop 10, the respective lengths 18 of the zones 12a, 12b, 12c of the loop are equal.

Figure 2:
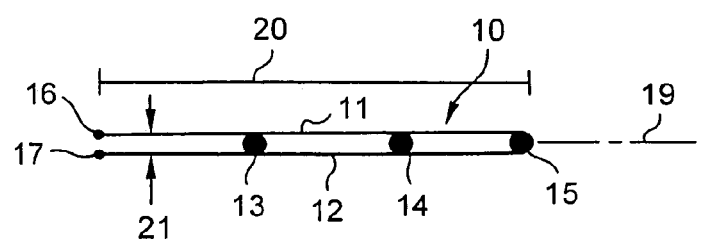
FIG. 2 is a simplified diagram of the FIG. 1 loop.
Figure 3:
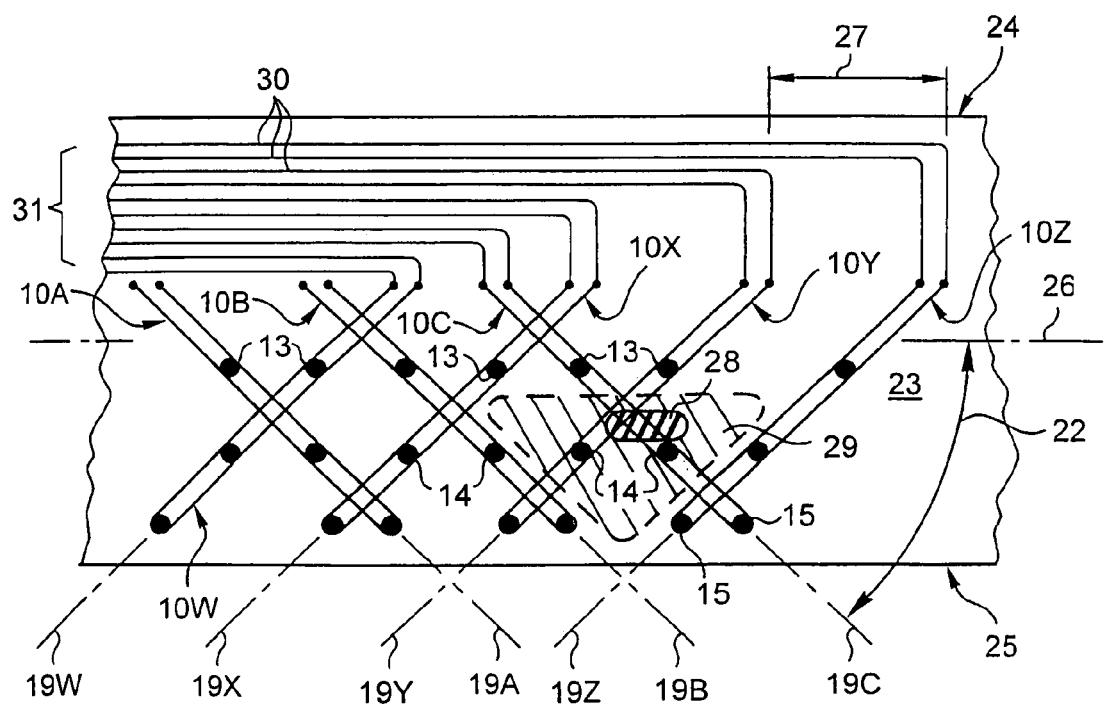
FIG. 3 is a diagrammatic plan view of a portion of a rotor blade showing how two superposed crossed arrays of loops are installed that are identical or similar to those of FIGS. 1 and 2.

With reference to FIGS. 2 and 3 in particular, in order to simplify the drawings, and taking account of the fact that the length 20 of a loop 10 is very long compared with the distance 21 between the strands 11 and 12 of the loop, the bridges 13 to 15 are represented diagrammatically by black spots tangential to the two parallel strands 11 and 12 of each loop 10.

With reference to FIG. 3 in particular, the blade 23 extends along a longitudinal axis 26 and presents a leading edge 24 and a trailing edge 25 that are substantially parallel to the axis 26.

The blade has a first array of loops comprising three substantially rectilinear loops 10a, 10b, and 10c extending along respective mutually parallel axes 19A, 19B, and 19C; these axes 19A to 19C are at an angle 22 close to 45° relative to the longitudinal axis 26 of the blade, which angle corresponds to the angle of inclination relative to the axis 26 of the fibers of a sheet of fibers (not shown) constituting the structure of the blade.

The blade 23 further includes a second array of loops comprising four substantially rectilinear loops 10W, 10X, 10Y, and 10Z extending along respective mutually-parallel axes 19W, 19X, 19Y, and 19Z; these axes are substantially perpendicular to the axes 19A to 19C.

Thus, the loops of the first array cross the loops of the second array, with the second array being superposed on the first array.

The loops of the first array are disposed in a first layer or sheet, while the loops of the second array are disposed in a second layer or sheet that is separated from the first layer or sheet by a layer (not shown) of an electrically insulating material, in particular the thermoplastic or thermosetting resin impregnating the fibers of the composite structure of the blade 23.

As a result, no electrical contact exists at the intersections of two overlying loops, such as the loops 10C and 10X.

Since the loops 10A to 10C and 10W to 10Z are identical, and since their mutual spacing 27 measured along the axis 26 is much less than the product of their common length (20 in FIG. 2) multiplied by $\sqrt{2}$, each loop of the first group or array crosses (in superposition) at least two loops of the second group or array of loops.

By meshing the arrays of loops and resistor bridges in this way, in the event of a break or an interruption occurring in the arrays in the shaded zone 28 of FIG. 3, the position and the approximate extent of the damage to the blade can easily be determined.

Supposing that all the resistor bridges present an impedance of 1 kilohm (kΩ), then such a break will open the loops 10C and 10Y in their middle zones, such that the impedances of these two loops will become 1 kΩ, whereas the impedances of the other loops will retain the "normal" value of about 333Ω.

As a function of the loop impedance measurements received from the system incorporated in the blade, an on-board computer controlled by a specific damage-monitoring program including data representative of the configuration of the meshes stored in a memory of the computer, can determine a maximum area 29 in which the damage must have occurred (and including the zone 28 that is actually damaged), corresponding to the impedance measurements; it is thus easy not only to determine the position of the damage, but also to determine an over-estimate of the extent of the damage.

Figure 4:
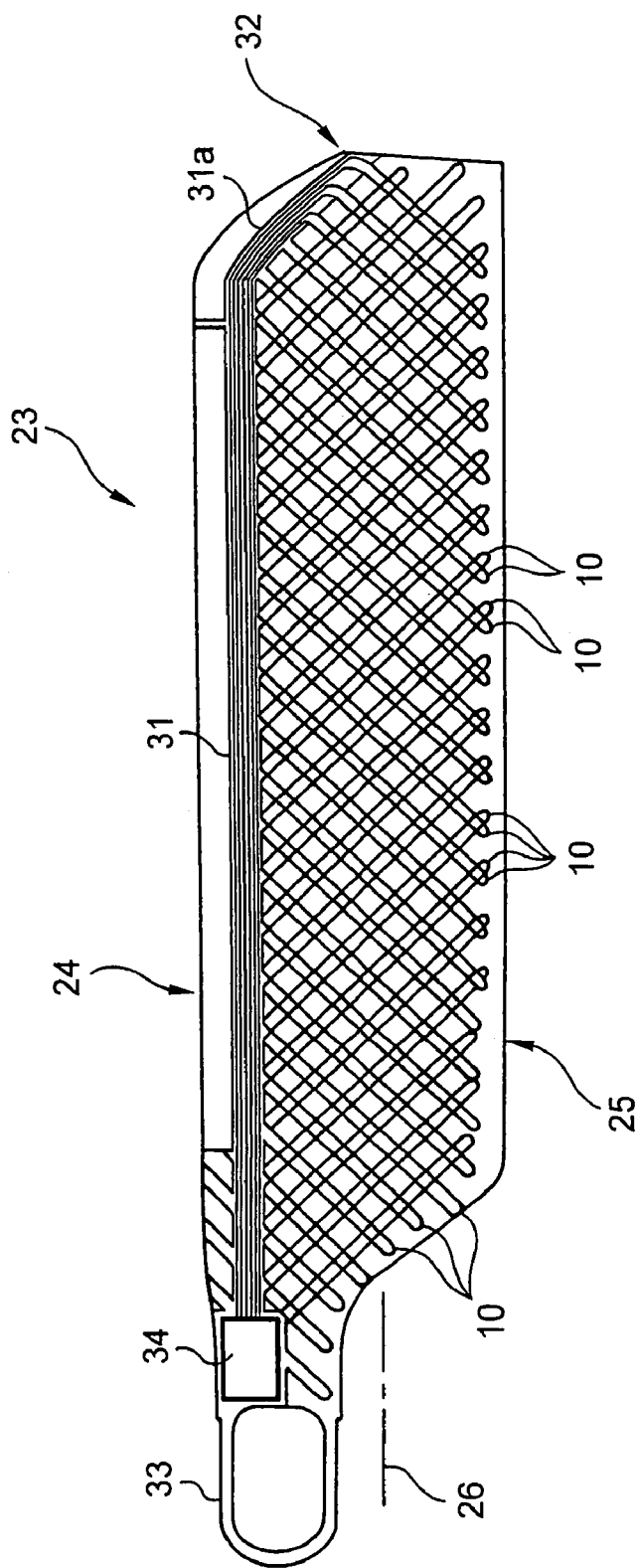
FIG. 4 is a diagrammatic plan view of a helicopter rotor blade incorporating a monitoring system of the invention.
Figure 5:
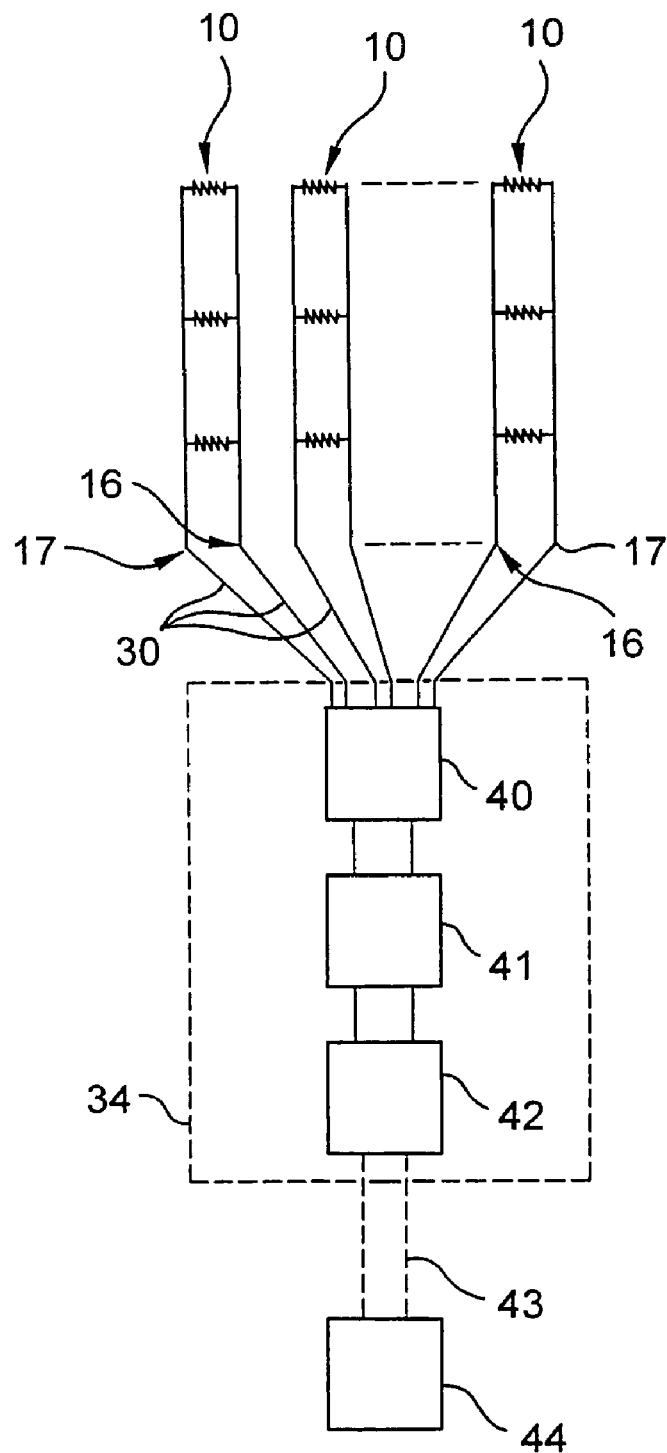
FIG. 5 is a simplified block diagram of means for sequentially measuring the impedances of the loops in a blade and for processing and transmitting the measurements to a computer on board an aircraft.

With reference to FIGS. 3 to 5, each resistive loop is connected by a pair of conductors 30 to a unit 34 integrated in the blade in the vicinity of the root zone 33 whereby the blade is connected (hinged) to the rotor (not shown).

Figure 6:
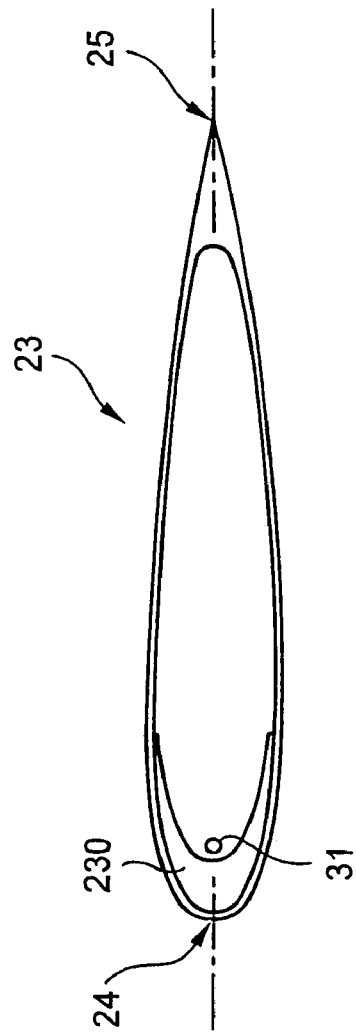
FIG. 6 is a diagrammatic cross-section view of a blade of the invention.

The conductors 30 are grouped together in a bundle 31 that extends longitudinally (parallel to the axis 26) close to the leading edge 24 of the blade 23, and close to the spar 230 of the blade 23 (cf. FIG. 6).

In order to reduce the number of conductors, a common power supply wire can be established for a plurality of adjacent loops or for all of the loops in an area, for example a pressure side or a suction side covering of the blade.

The loops 10 extend from the bundle to the vicinity of the trailing edge 25.

With reference to FIG. 4, the bundle 31 presents an end portion 31a in the vicinity of the free end 32 of the blade 23, which end portion follows the angle of inclination of the leading edge in this location.

In the vicinity of the root 33 of the blade 23, resistive loops also extend between the bundle 31 and the leading edge 24.

In order to avoid overcrowding FIG. 3, the conductors 30 are shown for loops 10W to 10Z; nevertheless, one pair of conductors (not shown) is also required for connecting each of the loops 10A to 10C to the unit 34 (FIGS. 4 and 5); the unit includes a multiplexer 40 or the like for successively scanning all of the loops of the blade, an impedance-measuring device 41 for measuring the impedance of each loop, and an analog-to-digital converter 42 for converting the measurement signals delivered by the impedance-measuring device into digital data.

Connection means 43 (wired or wireless) serve to convey the impedance data delivered by the converter 42 to the computer 44 on board the aircraft, for each of the blades of the aircraft rotor.

Where appropriate, impedance data for the loops can be conveyed and the components housed in the unit on the blade can be powered via electrical conductors for delivering power and/or transporting data as already used by some other system incorporated in the blade, e.g. a system for de-icing the blade.

A battery (not shown) incorporated in the unit 34 serves to power the components 40 to 42.

The invention is particularly applicable to composite blades as described in French patents Nos. 2 740 379, 2 699 498, and/or 2 699 499.

What is claimed is:

1. A rotary-wing aircraft rotor blade, comprising:
   a skin and a composite structure with fibers that define leading and trailing edges, a longitudinal axis, and a root zone opposite a free end of the blade; and
   a damage monitoring system comprising,
   under said skin, first and second arrays of loops that each has electrical continuity in the absence of damage to the blade, said first and second arrays overlapping and being separated from each other by an insulating material, wherein loops of said first array extend along respective axes that are oblique to said longitudinal axis and loops of said second array extend along respective axes that are substantially perpendicular to the axes of said first array, and
   under said skin in a vicinity of said root zone, an integrated unit that is connected to said loops of said first and second arrays by conductors that are grouped together in a bundle extending longitudinally inside the blade near said leading edge, said integrated unit also being connected to convey data from said monitoring system to an aircraft, said integrated unit comprising an impedance measuring and scanning device for repeatedly scanning an impedance of each of said loops of said first and second arrays.

2. The blade of claim 1, wherein said loops in said first and second arrays are electrically conductive.

3. The blade of claim 1, wherein said loops in said first and second arrays are semiconductive.

4. The blade of claim 1, wherein said leading and trailing edges are substantially parallel to each other.

5. The blade of claim 1, wherein said loops in said first and second arrays extend from said bundle toward the trailing edge.

6. The blade of claim 1, wherein said integrated unit further comprises an analog-to-digital converter that transforms measurements from said impedance measuring device into digital impedance data.

7. The blade of claim 1, wherein each of said loops comprises two strands and a plurality of elements that present substantially identical electrical impedance connecting said two strands in parallel.

8. The blade of claim 7, wherein each of said plurality of elements essentially comprises an SMC resistor.

9. The blade of claim 7, wherein each of said loops comprises at least three of said plurality of elements regularly spaced apart from one another.

10. The blade of claim 1, comprising several tens of said loops in said first and second arrays.

11. The blade of claim 1, wherein the axes of said first and second arrays are about 45° to the longitudinal axis of the blade.

12. The blade of claim 1, wherein the axes of at least some of said first and second arrays are generally parallel to axes of said fibers.

13. A rotary-wing aircraft comprising:

a plurality of the blades of claim 1; and inside the aircraft, a computer connected to said integrated unit and associated with a memory containing data representative of a configuration of said loops in each of said blades, said computer comprising means for determining in real time a location of damage to said blades that is responsive to said data from said integrated unit.

\* \* \* \* \*